United States Patent [19]
Sarno

[11] 3,772,158

[45] Nov. 13, 1973

[54] BUTADIENE RECOVERY PROCESS

[75] Inventor: Dante H. Sarno, El Cerrito, Calif.

[73] Assignee: Shell Oil Company, Houston, Tex.

[22] Filed: Mar. 29, 1971

[21] Appl. No.: 129,085

[52] U.S. Cl.................. 203/53, 203/54, 203/58, 203/60, 203/62, 203/65, 203/78, 203/80, 260/681.5 R

[51] Int. Cl............................................ C07c 7/08

[58] Field of Search .................. 203/26, 88, 78, 80, 203/84, 49, 60, 58, 65, 62, 54, 53, 100; 260/681.5 R

[56] References Cited
UNITED STATES PATENTS

| | | | |
|---|---|---|---|
| 2,376,425 | 5/1945 | Frey | 260/681.5 R |
| 3,436,436 | 4/1969 | Takao et al. | 203/60 |
| 2,920,113 | 1/1960 | Pollock et al. | 260/681.5 R |
| 2,993,841 | 7/1961 | Sarno | 260/681.5 R |

FOREIGN PATENTS OR APPLICATIONS 1,158,566    7/1969    Great Britain

*Primary Examiner*—Wilbur L. Bascomb, Jr.
*Attorney*—Howard W. Haworth and Henry C. Celler

[57] ABSTRACT

A process for separating butadiene from mixtures of butadiene and $C_4$ unsaturates in an extractive distillation of the mixture in the presence of a polar solvent and recovering the butadiene from the fat solvent mixture is disclosed. The butadiene-containing hydrocarbon mixture is introduced to the intermediate portion of an extractive distillation zone wherein it is contacted with the polar solvent which flows downwardly in the zone. In this manner butadiene is recovered in the fat solvent from the bottom of the extractive distillation zone. This fat solvent is introduced to a flash zone, operated at a pressure lower than that of the extractive distillation zone wherein a major portion of the butadiene is vaporized. The remaining solvent, partially depleted in butadiene, is then transferred to a first stripping zone operated at a pressure lower than the extractive distillation zone where the remaining butadiene is stripped from the solvent. The butadiene rich vapor from this first stripping zone is then combined with the vapor obtained in the flash zone and the resulting mixture is compressed. A portion of the compressed vapor is returned to the bottom portion of the extractive distillation zone and butadiene is recovered from the remaining portion of the compressed vapor in a second stripping zone.

3 Claims, 1 Drawing Figure

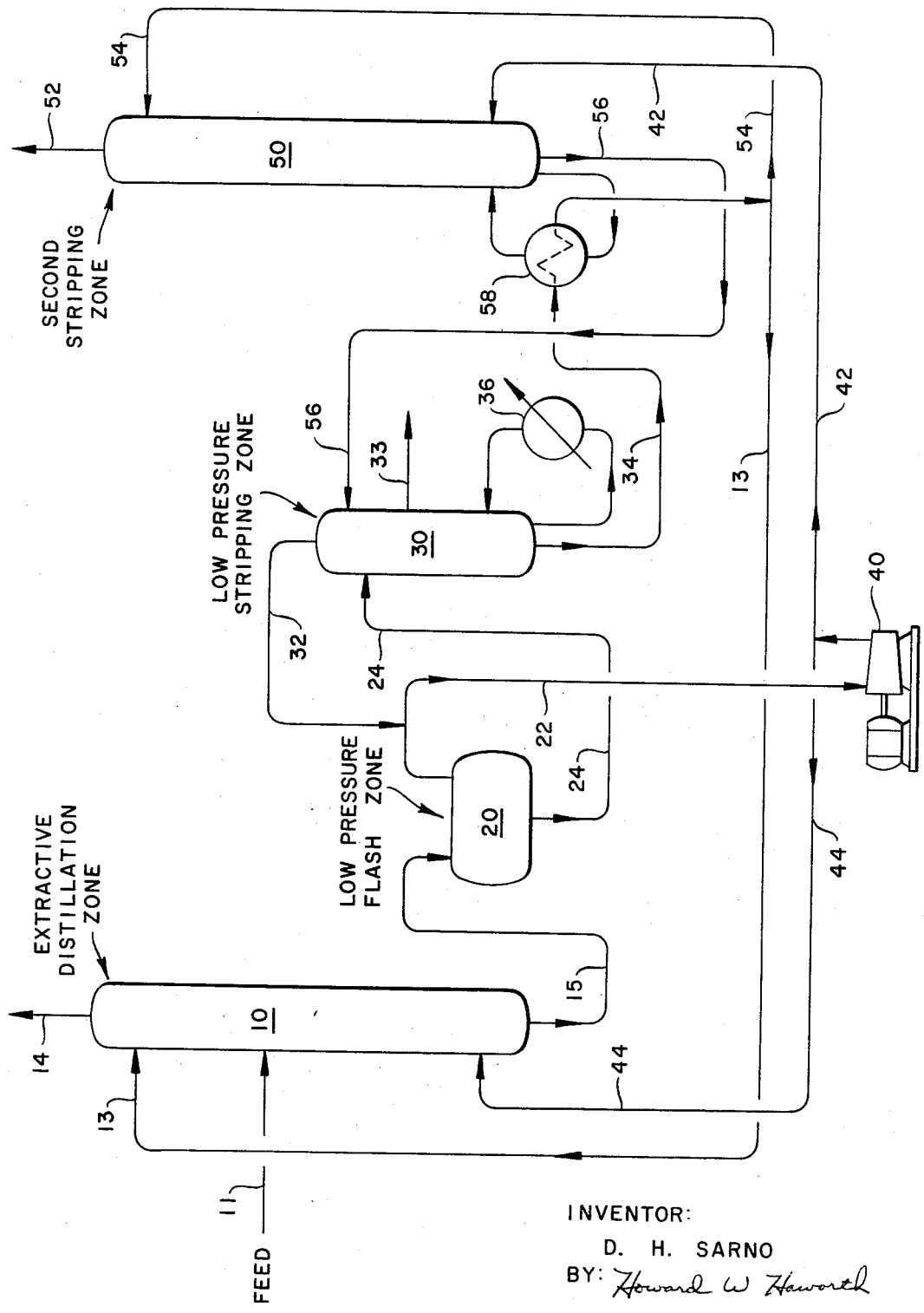

BUTADIENE RECOVERY PROCESS

BACKGROUND OF THE INVENTION

Butadiene is an important starting material for the chemical industries and is prepared commercially by dehydrogenation of more saturated hydrocarbons. It can be prepared from n-butane or n-butene by dehydrogenation over certain catalysts, such as the so-called Houdry catalysts, or from n-butene over potassium promoted iron oxide chromic oxide catalysts or over calcium nickel phosphate catalysts. Another useful process is iodinative dehydrogenation of the more saturated alkanes and/or alkenes.

Common to all these dehydrogenation processes is the production of butadiene in a hydrocarbon mixture with other unsaturates and saturates. Typically, there are hydrocarbons in the mixture whose normal volatilities are such that separation cannot be readily achieved by ordinary fractional distillation. For example, the butanes are difficulty separated from the butenes and the butadiene is likewise difficultly separated from the butenes.

Conventionally, butadiene has been separated from its corresponding olefins and paraffins by an extractive distillation in the presence of a polar solvent, selected for its ability to increase the volatility of some components in the mixture relative to other components in the mixture with the result that separation of the desired component by distillation is made possible. Polar solvents such as acetonitrile, acetone, furfural, dimethylformamide, dioxane, phenol and N-methylpyrrolidone, and their corresponding aqueous admixtures have been used in extractive distillation processes for butadiene.

In an extractive distillation of butadiene from a mixture containing butadiene and other $C_4$ saturates and unsaturates, the butanes and butenes exhibit an enhanced volatility relative to the diolefin and acetylenic materials and are recovered as an overhead product from the extractive distillation zone. The less volatile hydrocarbons, e.g., the diolefins and higher acetylenes, are separated together with the polar solvent (the mixture is commonly referred to as fat solvent) as the bottoms product from the extractive distillation zone.

In the conventional extractive distillation processes the butadiene product is recovered directly from the fat solvent in a stripping zone at elevated temperature. The energy required to effect the separations in the extractive distillation zone and in the stripping zone is supplied in a reboiler attached to each zone.

The conventional extractive distillation method as herein described suffers from several disadvantages. One disadvantage is that under typical operating conditions, the diolefins and higher acetylenes are exposed to high temperatures, particularly in the reboiler sections of the extractive distillation zone and the stripping zone. Exposure to these high temperatures promotes polymerization of the diolefins and higher acetylenes with the resulting formation of fouling deposits. Such deposits reduce the efficiency of the process equipment and shortens the length of time the unit can be operated without a turnaround.

Another disadvantage is that large amounts of heat energy are required due to the high operating temperature of the system and the poor utilization of the energy within the system. It would be an advantage to carry out an extractive distillation so as to minimize the energy requirements for the separation and reduce the maximum temperature to which the diolefin and higher acetylenes would be exposed.

The temperature in the extractive distillation zone is dependent upon the pressure at which the distillation is carried out. As the pressure of the extractive distillation zone is lowered, the temperature at which the desired separation can be effected will likewise be lowered. However, as one lowers the pressure at which the extractive distillation is carried out the temperature at which the overhead vapors can be condensed is likewise lowered. Consequently, there is an operating pressure below which the normal plant cooling water will no longer condense the overhead vapors. To operate at such pressure or below requires either that the coolant be refrigerated to a temperature which will condense the overhead vapors or that the overhead vapors be compressed to a pressure at which the condensation can be effected with the available coolant. See, for example, Hydrocarbon Processing, Vol. 47 No. 11, November, 1968, p. 135. Either alternative is economically unattractive and in practice the extractive distillation is generally carried out at a pressure at which the overhead vapors can be condensed without further compression using available cooling water. There remains, however, the problems of high reboiler temperatures and large energy requirements for the separation.

It is known that at a given operating pressure the extractive distillation zone can be operated with a bottoms temperature lower than would otherwise be possible by injecting into the bottom of the zone a vapor stream rich in the hydrocarbon being removed in the bottoms liquid. One manner in which this can be accomplished is to recycle a portion of the overhead vapor product from the stripping zone. To do so, however, is not economically attractive. Moreover, the advantage of the slightly lower temperature is realized only in the extractive distillation zone and is more than offset by the disadvantage of an increased heat duty in the stripping zone.

Another approach to the problem involves utilization of the sensible heat of the fat solvent to provide a butadiene-rich vapor. For example, in U.S. Pat. No. 3,436,436 a process is described wherein the fat solvent from the extractive distillation zone is introduced to a recovery zone operated at a lower pressure. A portion of the hydrocarbon contained in the fat solvent is vaporized, compressed and returned to the bottom of the extractive distillation zone. In this manner a lower operating temperature is attained in the extractive distillation zone. The remaining hydrocarbon contained in the fat solvent is then recovered in a conventional stripping zone.

Although this process does provide for better utilization of the sensible heat energy of the fat solvent and a means for obtaining a slightly lower temperature in the extractive distillation zone, it has several important disadvantages. First, it is to be noted that all of the eventual butadiene product which is recovered by this process must be contained in the partially depleted fat solvent removed from the low pressure recovery zone. There results, therefore, a limitation on the extent to which the sensible heat of the fat solvent may be utilized in producing vapor to recycle to the bottom of the extractive distillation zone. And consequently the extent to which the temperature in the bottom of the extractive distillation zone is lowered is limited. Second, the somewhat lower temperature which does result is realized only in the extractive distillation zone; there is no reduction in temperature in the stripping zone. Third, the vapor obtained from the low pressure recovery zone, which is to be compressed and recycled to the extractive distillation zone, can contain large amounts of vaporized solvent and water. The presence of substantial quantities of solvent and water in the vapor being compressed not only increases the temperature rise during compression but also contributes to other compressor problems. Also, less benefit is obtained in the extractive distillation zone where the recycled vapor contains substantial amounts of solvent and water. And finally, the process fails to provide for an economically attractive method of recovering the butadiene contained in the fat solvent. Where the subsequent stripping is carried out at a pressure such that available cooling water can be used to condense the overhead product, there results a large heat duty for the stripping operation and high temperatures in the lower sections of the stripping zone, particularly in the reboiler. The alternative of stripping at low pressures is likewise undesirable because while the heat duty and temperatures experienced are somewhat lower, there is the added expense of providing either a refrigerated coolant or an additional compressor in order to condense the overhead product. It would be an advantage to recover butadiene from a mixture of $C_4$ unsaturates in a process which would provide for comparatively low temperatures in all portions of the process and which would avoid the expensive requirement of refrigeration or compression facilities to condense the overhead vapor products.

SUMMARY OF THE INVENTION

The above advantage has been obtained by initially recovering the butadiene from the fat solvent at low pressure as butadiene-rich vapor products from a flash zone and a first stripping zone, combining and compressing the vapor streams from said zones to a pressure higher than that of the extractive distillation zone, and recycling a portion of this compressed vapor to the bottom of the extractive distillation zone. Butadiene is recovered from the remaining portion of the compressed vapor in a second stripping zone. Accordingly the present invention provides a process for separating butadiene from mixtures of $C_4$ unsaturates which comprises a) introducing said butadiene-containing hydrocarbon mixture into an extractive distillation zone wherein it is distilled in the presence of a selective polar solvent with the result that substantially all of the olefins and paraffins are recovered as the overhead vapor product from said zone and substantially all of the butadiene is recovered together with the polar solvent — the mixture is referred to as the "fat solvent" — as the bottoms product from said zone; b) introducing said fat solvent to a flash zone operated at a pressure lower than that of the extractive distillation zone wherein a major portion of the butadiene is vaporized thereby forming a first vapor phase and a partially depleted fat solvent; c) transferring the partially depleted fat solvent from the bottom of the flash zone to a first stripping zone operated at a pressure lower than that of the extractive distillation zone wherein the remaining butadiene is stripped from the fat solvent thereby forming a second butadiene-rich vapor phase; d) combining the first vapor phase with the second vapor phase; e) compressing the combined vapor phases to a pressure higher than that of the extractive distillation zOne; f) returning a portion of the compressed vapor to the bottom of the extractive distillation zone; and, g) introducing the remaining portion of the compressed vapor to a second stripping zone wherein butadiene is recovered as an overhead product. The combination of the flash zone and the first stripping zone operated at a pressure lower than that of the extractive distillation zone results in a significantly lower temperature in both the extractive distillation zone and the stripping zones. Moreover, the process consumes less heat energy for the desired separation and does not require a refrigeration system or an additional compressor to facilitate the condensation of overhead vapor products.

BRIEF DESCRIPTION OF THE FIGURE

The invention will be illustrated by reference to the attached FIGURE which represents a schematic flow diagram of a preferred embodiment of the invention wherein butadiene is separated and recovered from a mixture of $C_4$ saturates and unsaturates employing aqueous acetonitrile as the extractive distillation solvent.

DESCRIPTION OF THE PREFERRED EMBODIMENTS

In accordance with the present invention a hydrocarbon fraction containing butadiene and other $C_4$ hydrocarbons is introduced into an intermediate section of an extractive distillation zone wherein the mixture is distilled in the presence of a polar solvent. The polar solvent, which is introduced into the upper section of the extractive distillation zone, generally near the top, flows downwardly through the zone thereby contacting the rising vapors. In the presence of the polar solvent, the less unsaturated hydrocarbons, e.g., butenes and butanes, are the more volatile components of the mixture and are distilled as overhead products. The more unsaturated hydrocarbons in the mixture, e.g., butadiene and the higher acetylenes, are recovered along with the polar solvent as the bottoms product — also referred to as "fat solvent."

The thermal energy required for the extractive distillation is provided by butadiene-rich vapors introduced into the bottom of the zone. However, contrary to conventional processes, the process of this invention provides a major portion of said vapors as compressed combined recycle vapors from the flash zone and the first stripping zone, to be hereinafter described. A reboiler, attached to the lower portion of the extractive distillation zone, may be employed to provide an additional source of thermal energy to that provided by the compressed recycle vapors; however, in the preferred modification of the present invention, the reboiler is not employed and all of the thermal energy is provided by the compressed recycle vapors.

The aforesaid butadiene-rich vapor is obtained in a multi-step process in which the fat solvent is introduced first into a flash zone and then into a first stripping zone whereby all of the hydrocarbon contained in the solvent is recovered as two vapor phases.

In the flash zone advantage is taken of the sensible heat of the fat solvent to provide the heat necessary to vaporize a major portion of the contained hydrocarbon at a lower pressure thereby forming a first vapor phase. The pressure obtained in the flash zone may be any pressure below that of the extractive distillation zone.

While from a theoretical standpoint it is an advantage to operate with as low a pressure as is possible in order to obtain full advantage from the sensible heat contained in the fat solvent, in actual practice there may exist any of several practical constraints as to how low a pressure is selected. Subatmospheric pressure are to be avoided because of the problems incident to the inevitable leakage of oxygen into the system. Also, there may be additional limitations on the minimum operating pressure selected due to pressure requirements in other parts of the process which may directly influence the pressure in the flash zone. Of particular significance is the effect of operating conditions in the low pressure stripping zone. While the pressure at which the flash zone is operated may be either higher or lower than the overhead pressure of the low pressure stripping zone, in general practice the two are nearly the same as the pressure at each point is maintained by the compressor suction to which each zone is connected. This common pressure will be somewhat above atmospheric pressure where the low pressure stripping zone must be operated to accommodate a side draw stripper which will be hereinafter described. In general the flash zone is operated at a pressure from about 25 psia to about 50 psia where the process design provides for the aforementioned side draw stripper. Temperatures in the flash zone under these operating conditions range from about 120°F to about 180°F. However, without the above pressure limitation due to the side draw stripper, the pressure in the flash zone can be as low as 18 psia and the corresponding temperature will be as low as 100°F.

The first vapor phase obtained in the flash zone is transferred to a compressor. The partially depleted fat solvent is collected in the bottom of the flash zone and is transferred to a first stripping zone, where it is introduced at an intermediate point, usually an upper section somewhere between the middle and top of the zone. The butadiene-containing solvent mixture flows downwardly in the zone contacting the rising vapors from the reboiler section with the result that the solvent removed from the bottom of the zone is substantially free of butadiene. This recovered stripped or lean solvent is recycled to the extractive distillation zone.

The operating pressure of the first or low pressure stripping zone may be conveniently selected at any level lower than that in the extractive distillation zone. And as was true with the flash zone, it is advantageous to operate the low pressure stripping zone at as low a pressure as is possible except that subatmospheric pressures are to be avoided for the reasons previously mentioned. Operating at the lower pressure offers several advantages. Temperatures are minimized; therefore, less polymerization occurs and fewer fouling deposits are formed. Stripping at the lower temperatures reduces energy requirements considerably. And most important, contrary to existing processes, the process of this invention facilitates the removal of the undesirable acetylenic materials. Due to the low temperatures which prevail throughout the low pressure stripping zone, the volatility difference between butadiene and the acetylenes is enhanced with the result that at intermediate portions in the low pressure stripping zone the acetylene concentration is quite high with respect to butadiene. It is advantageous to remove the acetylenes at this point in a solvent-rich mixture from which the acetylenes can subsequently be stripped in a side draw stripper such as taught for example in U.S. Pat. No. 3,317,627.

The process design involving the side draw stripper can affect the pressure at which the low pressure stripper is to be operated. Where the side draw stripper is designed to include its own reboiler to provide the energy to strip the acetylenes from the solvent mixture, there is little effect on the operating pressure of the low pressure stripper. In such cases the operating pressure of the low pressure stripper can be quite low, for instance, as low as 18 psia. The bottoms temperature at this pressure can be as low as 200°F. However, where the side draw stripper is designed to operate without its own reboiler in what is believed to be a novel process, the low pressure stripper will necessarily be operated at a higher pressure. The higher pressure is required so that sufficient sensible heat is available to strip the acetylenes when the acetylene-containing stream is introduced into the side draw stripper at a lower pressure, and so that vapor from a lower portion of the low pressure stripping zone can be introduced into the side draw stripper to provide additional heat energy for the stripping operation.

The operating pressure of the low pressure stripper must be still higher if the side draw stripper overhead must be maintained at a pressure which will provide sufficient pressure differential to enable further processing of the stripper vapors without the need for a compressor. Generally, with a side draw stripper operated without its own reboiler, the operating pressure of the low pressure stripper can be as high as 50 psia in which case the corresponding bottoms temperature will be approximately 250°F. However, even under these conditions the maximum temperatures experienced are still considerably lower than in many existing processes.

The butadiene-rich vapor phase is then transferred to the compressor previously mentioned wherein it is combined with the butadiene-rich vapor phase obtained from the flash zone. The resulting combined vapor is then compressed to a pressure at least high enough so that the compressed vapor can be returned to the bottom of the extractive distillation zone without further compression. The compressor discharge pressure selected may of course be still higher depending upon the operating pressure selected for the second stripping zone.

After compression the butadiene-rich vapor stream is divided into two portions. One portion of the compressed vapor, typically the major portion, is returned to the bottom of the extractive distillation zone to supply the energy required for the extractive distillation. The remaining portion of the compressed vapor is introduced into an intermediate section of a second stripping zone wherein butadiene is recovered as an overhead product.

The overhead pressure of the second stripping zone is generally maintained at a pressure such that the overhead butadiene-containing vapors can be condensed without resort to refrigerated coolants or additional compression facilities. Overhead pressures are generally in the range of from about 60 psia to about 100 psia. Operating at these pressures the maximum bottoms temperatures in the stripping zone are generally from about 130°F to about 180°F. If acetylenic materials are withdrawn in a side draw stripper as previously described, lean solvent is injected into the top of the second stripping zone to provide a solvent environment such that any remaining acetylenic materials present in the feed to the second stripping zone are substantially removed as bottoms product from the zone. The bottoms product, a solvent rich mixture containing the acetylenic materials, butadiene, and other high boiling hydrocarbon is returned to an upper portion of the low pressure stripping zone where the various components are separated and recovered. If acetylene removal is not a feature of the process then there would be no need to inject lean solvent into the top of the second stripping zone.

The thermal energy required for the stripping operation is contained to a great extent in the compressed vapor feed to the zone. However, supplemental energy is provided by heat exchange with the hot lean solvent from the first stripping zone.

The pressure at which the extractive distillation is carried out may be varied, and will depend upon the composition of the feed mixture, the separation desired and the manner by which the overhead vapors from the extractive distillation zone will be condensed. To avoid the uneconomical deployment of refrigeration facilities or a compressor to facilitate the condensation of these overhead vapors, the extractive distillation is generally carried out at a pressure such that the condensation can be effected with available plant cooling water, for example, an overhead pressure from about 60 psia to about 100 psia.

The polar solvent which is used in the extractive distillation is selected for its ability to effect a difference in the relative volatilities among the components to be distilled with the result that the desired separation will be achieved. Solvents which may be used in the process of this invention include acetonitrile, acetone, furfural, dimethylformamide, dioxane, phenol and N-methylpyrrolidone, or their aqueous mixtures. The amount of solvent injected into the extractive distillation zone will vary depending upon the composition of the hydrocarbon feed stream, the degree of separation desired and the solvent system selected.

Now reference will be made to the attached FIGURE which represents a schematic flow diagram of a preferred embodiment of the present invention wherein butadiene is recovered from a $C_4$ unsaturate mixture and the extractive distillation solvent employed is aqueous acetonitrile. It is to be understood that the FIGURE is only a schematic representation of the process and does not purport to show the conventional instrumentation and valving present in a typical process.

A $C_4$ fraction from a dehydrogenation zone carried by Line 11 is introduced into an extractive distillation column 10 at an intermediate point. The column operates at a top pressure of approximately 90 psia and with a bottoms pressure of approximately 105 psia. Acetonitrile solvent containing approximately 10 wt percent water enters a top portion of the extractive distillation column 10 via Line 13 at a temperature of approximately 130°F. A hydrocarbon stream containing $C_4$ olefins and paraffins and which is substantially free of butadiene is removed as an overhead product via Line 14. A fat solvent containing essentially butadiene, any acetylenes such as vinyl and ethyl acetylene, and the aqueous acetonitrile solvent is removed from the base of the extractive distillation column 10 in a Line 15. The thermal energy required for the extractive distillation is supplied by the butadiene-rich vapor which is introduced via Line 44 into the bottom of the extractive distillation column 10. In such manner a comparatively low temperature of approximately 180°F is maintained in the bottom of the extractive distillation column 10.

The fat solvent from the bottom of the extractive distillation column 10 is carried via Line 15 to a flash drum 20, operated at a pressure of approximately 35 psia, wherein a major portion of the butadiene contained in the fat solvent vaporizes at the lower pressure. The temperature in the flash drum 20 is approximately 150°F. The butadiene-rich vapor which collects in the top of the flash drum 20 is carried by Line 22 to the suction of compressor 40. The fat solvent partially depleted of butadiene collects in the bottom of the flash drum 20 and is carried by Line 24 to the upper portion of the first stripping column 30.

In the first stripping column 30 heat is added via a reboiler 36 to strip the remaining butadiene from the fat solvent. A butadiene-rich vapor is recovered as an overhead product and is carried via Line 32 to the suction of compressor 40 where it is combined with the butadiene-rich vapor obtained from the flash drum 20. Lean solvent stripped of essentially all of the butadiene is recovered as a bottoms product via Line 34.

The operating pressure of the first stripping column 30 is approximately 35–40 psia which results in a comparatively low bottoms temperature of 230°F. The low temperature enhances the difference in relative volatility between butadiene and vinyl acetyelene with the result that the acetylene content of the final butadiene product is maintained at a relatively low level by withdrawing a solvent rich stream rich in acetylenes via Line 33 from an intermediate point the first stripping column 30. From this stream the acetylenes can be removed in a side drawn stripper (not shown in the drawing) or by other appropriate means.

The butadiene-rich vapor streams from the flash drum 20 and the overhead from the first stripping column 30 are combined and compressed by means of a compressor 40 to a pressure of approximately 115 psia. The compressed vapor stream is then divided into two portions. One portion is recycled via Line 44 to the bottom of the extractive distillation column 10. The other portion is transferred via Line 42 to a second stripping column 50 wherein butadiene is recovered as an overhead product via Line 52.

The second stripping column 50 is operated at an overhead pressure of approximately 90 psia to facilitate the condensation of the overhead butadiene vapors with normal cooling water. Lean solvent is injected via Line 54 near the top of the column to facilitate the separation of acetylenic materials from the butadiene product. A solvent-rich bottoms product is recycled via Line 56 to the top of the first stripping column 30 wherein the butadiene and acetylenic materials are separated from the solvent. Thermal energy for the stripping operation is provided by a bottoms exchanger 58 wherein heat is exchanged with hot lean solvent from the bottoms of the first stripping column 30. The maximum temperature attained in the bottoms of the second stripping column 50 is approximately 210°F.

The above invention is characterized in that the process results in a substantial reduction in the total thermal energy required to effect the overall recovery of product and further that the temperature to which the butadiene product is exposed is reduced in both the extractive distillation zone and in the stripping zone.

The process of the invention is suitable for the recovery of $C_3$ to and including $C_6$ unsaturated hydrocarbons from a hydrocarbon mixture containing one of these compounds and its corresponding mono-olefin and/or paraffin. A broad spectrum feed stock containing compounds of varying carbon numbers may be used, but generally fractional distillation is advantageously employed to provide a narrow cut, e.g., a $C_4$ or $C_5$ cut for the extractive distillation. The process is particularly beneficial for the separation of $C_4$ or $C_5$ alkadienes from their corresponding unsaturate mixtures, as the problems of solvent instability and high temperatures are emphasized in these separations.

Butadiene, which is obtainable by application of the present invention in the preferred modification is of commercial importance for use in the manufacture of synthetic rubbers, pharmaceuticals and the like.

I claim as my invention:

1. In the process of separating butadiene from mixtures of butadiene and $C_4$ hydrocarbons in an extractive distillation of the mixture in the presence of a selective polar solvent wherein the butadiene is initially obtained in the fat solvent bottoms stream resulting from said extractive distillation with the less unsaturated hydrocarbons being recovered as overhead products from said extractive distillation, and wherein the butadiene is ultimately recovered from said fat solvent in a stripping zone, said process comprising: introducing said fat solvent bottoms stream to a flash zone operated at a pressure lower than that of the extractive distillation zone, thereby forming a. a first vapor phase comprising a major portion of the butadiene present in said fat solvent and at least a portion of the polar solvent and
   b. a first liquid phase comprising a minor portion of the butadiene present in said fat solvent and the major portion of the polar solvent, and transferring the first liquid phase to a low pressure stripping zone operated at a pressure lower than the extractive distillation zone thereby forming a second vapor phase enriched in butadiene relative to the first vapor phase, the improvement which comprises:

1. intimately mixing said first vapor phase and said second vapor phase,
   2. compressing the resulting mixed vapor phase,
   3. returning a portion of the compressed mixed vapor phase to said extractive distillation zone,
   4. passing the remainder of the compressed mixed vapor phase into a second stripping zone operating at a pressure of from 60 to 100 psia, which pressure is greater than the pressure of the low pressure stripping zone,
   5. recovering butadiene from the remainder of the compressed mixed vapor phase as overhead product from said second stripping zone,
   6. transferring the bottoms from said second stripping zone to the top of the low pressure stripping zone, and recovering lean solvent from the bottom of said low pressure stripping zone.

2. A process according to claim 1 wherein the polar solvent is selected from the group consisting of acetonitrile, acetone, furfural, dimethylformamide, dioxane, phenol and N-methylpyrrolidone and their aqueous admixtures.

3. A process according to claim 2 wherein the polar solvent is aqueous acetonitrile having at least 10 mol percent water.

* * * * *